United States Patent [19]

Scarati et al.

[11] Patent Number: 5,382,614
[45] Date of Patent: Jan. 17, 1995

[54] PERFLUOROPOLYETHER LUBRICANTS FOR MAGNETIC RECORDINGS

[75] Inventors: Mario A. Scarati; Gerardo Caporiccio, both of Milan, Italy

[73] Assignee: Ausimont S.p.A., Milan, Italy

[21] Appl. No.: 130,144

[22] Filed: Sep. 17, 1993

Related U.S. Application Data

[63] Continuation of Ser. No. 993,892, Dec. 18, 1992, abandoned, which is a continuation of Ser. No. 677,378, Mar. 27, 1991, abandoned, which is a continuation of Ser. No. 432,310, Nov. 3, 1989, abandoned, which is a continuation of Ser. No. 267,649, Nov. 2, 1988, abandoned, which is a continuation of Ser. No. 29,641, Mar. 24, 1987, abandoned.

[30] Foreign Application Priority Data

Mar. 27, 1986 [IT] Italy .................... 19910 A/86

[51] Int. Cl.$^6$ ............................................. C08K 5/15
[52] U.S. Cl. ....................... 524/108; 523/181; 524/285; 524/307; 524/366; 524/367; 524/373; 252/62.54
[58] Field of Search .............. 523/181; 524/108, 285, 524/307, 366, 367, 373; 252/62.54

[56] References Cited

U.S. PATENT DOCUMENTS

| | | | |
|---|---|---|---|
| 4,239,828 | 12/1980 | Knope et al. | 428/421 |
| 4,267,238 | 5/1981 | Chernega | 428/480 |
| 4,268,556 | 5/1981 | Pedrotty | 428/64 |
| 4,526,833 | 7/1985 | Burguette et al. | 428/336 |
| 4,647,413 | 3/1987 | Sauu | 528/402 |
| 4,671,999 | 6/1987 | Burguette et al. | 428/692 |
| 4,721,795 | 6/1988 | Caporiccio et al. | 549/445 |
| 4,757,145 | 7/1988 | Caporiccio et al. | 546/81 |
| 4,808,472 | 2/1989 | Caporiccio et al. | 428/336 |
| 4,889,939 | 12/1989 | Caporiccio et al. | 549/13 |

Primary Examiner—Peter D. Mulcahy
Attorney, Agent, or Firm—Stevens, Davis, Miller & Mosher

[57] ABSTRACT

Difunctional perfluoropolyetheral compounds having polar or non-polar hydrogenated end groups, suitable for being used as inner lubricants in the chemical formulation of the active layer of magnetic recording media, characterized by a solubility in methylethylketone at 20° C. ranging from 0.05% to 2% by weight.

3 Claims, No Drawings

PERFLUOROPOLYETHER LUBRICANTS FOR MAGNETIC RECORDINGS

This application is a continuation of application Ser. No. 07/993,892, filed Dec. 18, 1992, now abandoned, which in turn is a continuation of application Ser. No. 07/677,378, filed Mar. 27, 1991, now abandoned, which in turn is a continuation of application Ser. No. 07/432,310, filed Nov. 3, 1989, now abandoned, which in turn is a continuation of application Ser. No. 07/267,649, filed Nov. 2, 1988, now abandoned, which in turn is a continuation of application Ser. No. 07/029,641, filed Mar. 24, 1987, now abandoned.

FIELD OF THE INVENTION

The invention relates to the lubrication of the magnetic recording media (records or tapes) based on magnetic pigments by means of inner-type lubricants, consisting of compounds having a perfluoropolyether structure, having hydrogenated end groups, having a critical solubility, as defined hereinafter, in the polymeric matrix constituting the magnetic layer.

THE PRIOR ART

As is known, within the class of the magnetic media based on particles or pigments, the recording magnetic medium comprises a layer of magnetic material spread on a rigid or flexible substrate.

This layer is composed of magnetic oxide particles and/or of metal particles dispersed in a thermoplastic or thermosetting polymeric binder, the base of which can be a polyvinyl, polyurethane, epoxy or phenolepoxy material, or proper mixtures thereof.

Other compounds are present in these formulation, their task being that of promoting the wettability and the dispersion of the magnetic pigments, or that of acting as lubricants to facilitate the sliding of the reading or recording head on the magnetic medium.

These compounds are generally referred to as "inner lubricants". The inner lubricant must possess certain typical characteristics; it must be partially soluble in the resin and compatible with same, but it may not act as a swelling agent or as a plasticizer on the resin, as in such case it would very adversely affect the compactedness and the mechanical characteristics of the media, in particular its resistance to wear.

The inner lubricant's mechanism of action is a slow and controlled migration through the micropores of the magnetic layer towards the surface, under the action of the temperature in the point of contact with the reading/writing heads and of the pressure resulting from this contact.

The materials generally utilized as inner lubricants are esters of fatty acids, fatty acids with a ramified or non-ramified chain, or mixtures thereof.

In spite of securing satisfactory performances and an increase in the life and abrasion resistance of the magnetic medium, these substances, as presently utilized in all the flexible magnetic media, do not exhibit long term stability and are sensible to oxidation.

It is known that better results with regard to friction and to duration are obtainable by using surface perfluoropolyether lubricants, due to their higher thermal and chemical stability and to their superior lubricating properties.

While originally neutral perfluoropolyethers were utilized as surface lubricants, improvements were achieved later, according to what is disclosed in U.S. Pat. Nos. 4,268,556 and 4,267,238, by introducing end groups of polar and reactive nature into the perfluoroether chain.

This approach, generally utilized in the field of the magnetic media of a more advanced technology, such as the rigid discs for computers, requires a process step, subsequent to the preparation of the medium, in which a thin lubricant film is applied to the surface of the disc in the form of a dilute solution.

In order to avoid this post-treatment with the lubricant, which involves considerable practical complications and a substantial increase in the production costs, inner lubricants are utilized of the above-mentioned type, which are directly introduced into the resin composition utilized to form the magnetic layer. This is only possible for flexible magnetic recording media.

However, these fatty acid esters compounds exhibited the above mentioned drawbacks.

Thus, there was the increasing need to have available an inner lubricant, stable to heat and to chemical agents, resistant to oxidation and resulting in magnetic media exhibiting higher performances than the ones attainable with the known hydrogenated inner lubricants, in particular as regards the use in the long term.

On the other hand, neutral perfluoropolyethers are not utilizable as inner lubricants, due to their low compatibility with and low solubility in the hydrogenated resins utilized as binders.

Such low solubility results in a quick and uncontrolled surface migration of the lubricant, with the consequent phenomena of sticking and formation of stains and deposits on the surface.

Furthermore, polyfluoropolyether compounds, with functional end groups of various type, which have a too high solubility in the polymeric matrix used as a binder are not utilizable because then act as plasticizers and cause a substantial worsening of the mechanical characteristics of the magnetic layer.

THE PRESENT INVENTION

It has now surprisingly been found that particular types of perfluoropolyethers having either polar or non-polar hydrogenated end groups which are liquid at a temperature of 25° C., when used as inner lubricants on flexible magnetic media lead to considerable improvements in the performance of the media.

Object of the present invention is therefore the use of inner lubricants in resin compositions for flexible paints for magnetic recording media, these lubricants being difunctional perfluoropolyether compounds which are liquids at a temperature of 25° C. By difunctional it is meant that there are functional groups at both ends of the perfluoropolyether chain. These perfluoropolyethers have hydrogented polar or non-polar end groups, an average molecular weight of the perfluorooxyalkylene chain of at least 1,000, a solubility at 20° C. in methylethylketone ranging from 0.05% by weight to 2% by weight, extremes included.

Another object of the present invention is resin compositions containing from 0.5 to 3% by weight of the inner lubricants described above.

The presence of hydrogenated end groups, either polar or non-polar, in combination with a sequence of perfluorooxyalkylene units of a suitable length ensures a partial compatibility with the resin, as is necessary to obtain a constant and controlled migration of the lubricant to the surface. In practice, the suitability of the perfluoropolyether compound can be ascertained on the basis of its solubility in methyl-ethyl-ketone at 20° C.; it must range from 0.05% to 2% by weight.

The hydrogenated end groups which usually impart the proper degree of solubility to the inner lubricant, are for example hydroxy, ester, aromatic, or heterocyclic end groups which contain oxygen.

In particular, the lubricants of the invention have end groups T and T' preferably selected from:

a) 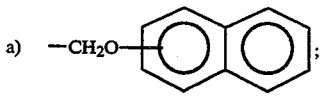

b) —CH₂O—(CH₂CH₂O)$_z$H, where z is an integer from 1 to 3;

c) 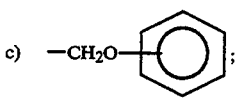

d) —COOR, where R is an alkyl radical with 2 to 12 carbon atoms:

e) 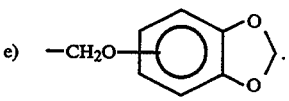

Suitable perfluoropolyether compounds according to the invention are in particular those belonging to the following classes:

$$TO(CF_2CR_2O)_n(CF_2O)_m\text{—}T'; \quad (I)$$

$$TO(CF_2CF_2O)_g(CF_2O)_h(\underset{\underset{CF_3}{|}}{C}FCF_2O)_p(\underset{\underset{CF_3}{|}}{C}FO)_qT'; \quad (II)$$

$$TO(CF_2CF_2CF_2O)_sT'; \quad (III)$$

$$T(OCF_2CF_2CH_2)_tOR_fO(CH_2CF_2CF_2O)_tT'; \quad (IV)$$

$$TO(CF_2CF_2O)_rT'; \quad (V)$$

$$T(O\underset{\underset{CF_3}{|}}{C}F_2CF)_uOR_fO(\underset{\underset{CF_3}{|}}{C}F\text{—}CF_2O)_uT'; \quad (VI)$$

where: T and T', which may or may not be the same, are hydrogenated end groups of the kind defined above; indexes n, m, g, h, p, q, s, t, r, u are integers selected in such manner that the perfluoropolyether chain has a mean molecular weight of at least 1,000 is preferably from 1,800 to 4,500, and in any case is such that the perfluoropolyether may be liquid at 25° C.;
R$_f$ is a fluoroalkylene radical;
the perfluoro-oxyalkylene units being statistically distributed along the chain.

Among the compounds described as suited to be used as inner lubricants according to the invention, the preferred ones have a perfluoro-oxyalkylene chain of type (I) with both end groups of type a) or of type b), indicated above.

The perfluoropolyethers utilizable for the present invention are preparable as follows:
the ones of class (I) according to the processes described in U.S. Pat. No. 3,242,218;
the ones of class (II) according to U.S. Pat. No. 3,665,041;

the ones of classes (III) and (IV);
the ones of class (V) according to U.S. Pat. No. 4,523,039;
the ones of class (VI) according to U.S. Pat. No. 4,647,413.

The functional end groups suitable for the present invention can be introduced according to the methods described in U.S. Pat. No. 3,810,874.

In the case of classes (II), (III) and (V), in which the starting perfluoropolyethers have only one functional end group, it is possible to produce the corresponding difunctional product through the process.

As mentioned above, the essential feature of an inner lubricant is that of having a critical solubility, of a narrow range, in the resin composition in which it is utilized. It has been ascertained that the products having such feature possess also a critical solubility, limited to an exactly defined range (from 0.05% to 2% by weight at 20° C.), in solvents such as tetrahydrofuran (THF), methylethylketone (MEK), isopropanol (iPrOH). These are hydrogenated solvents which, as is known, are used in the resin compositions utilized to form the magnetic layer.

For illustrative purposes, the solubilities of a few perfluoropolyether compounds of this invention in the above-listed solvents are indicated below. Also, the data concerning the solubility of a perfluoropolyether compound unsuitable for the purposes of this invention is also included in the following examples for the purposes of comparison.

TABLE I

| Substance | Solubility (% by weight) at 20° C. | | |
|---|---|---|---|
| | THF | MEK | iPrOH |
| A | 0.10 | 0.15 | 0.15 |
| B | 0.12 | 0.17 | 0.18 |
| C | 0.12 | 0.14 | 0.16 |
| D (comparative) | 0.02 | 0.03 | 0.03 |

The substances indicated with A, B, C and D are respectively:

A: perfluoropolyether of class (I) having a mean molecular weight of the perfluoropolyether chain equal to 2,000 and both end groups are of formula —CH₂OCH₂CH₂OH;

B: perfluoropolyether of class (I) having a mean molecular weight of the perfluoropolyetheral chain equal to 2,000 and both end groups of formula: —CH₂OCH₂CH₂OCH₂CH₂OH;

C: perfluoropolyether of class (I) having a mean molecular weight of the perfluoropolyetheral chain equal to 2,000 and both end groups of formula:

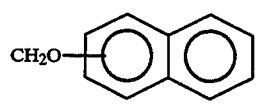

D: perfluoropolyether of class (I) having a mean molecular weight of the perfluoropolyetheral chain equal to 2,000 and both end groups of formula:

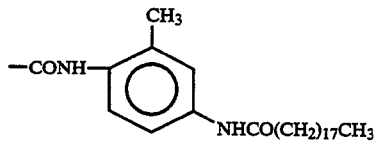

The fluorinated inner lubricants of the invention may be used in resin compositions which form the magnetic layer in amounts ranging from 0.5% to 3% by weight.

The following examples are only illustrative of the invention and are not to be construed as a limitation thereof.

EXAMPLE 1

Preparation of Video Tapes

Video tapes based on polyurethane/epoxy resins were prepared, using the following composition (parts by weight):

| | |
|---|---|
| a) Pigment (magnetic) | |
| ferrite BAYFERROX ® AC type 5127 M | 76.0 |
| b) Resins | |
| phenolepoxy resin UNION CARBIDE UCAR ® type PKHH | 4.82 |
| polyurethane prepolymer GOODRICH ESTANE ® 5701 F1 | 14.46 |
| c) Crosslinking agent | |
| DESMODUR ® R of Bayer (isocyanate crosslinking agent) | 1.02 |
| d) Dispersant | |
| GAFAC ® RM 710 (phosphoric acid ester) | 3.0 |
| e) Inner lubricant: in variable concentrations from 1 to 3% by weight on the total of the above-specified composition, selected from compounds A, B, C of the invention and comparative compound D described above and isocetyl-stearate (ICS) (a further comparative compound, utilized in the art as an inner lubricant). | |

The paint was prepared according to known methods by preparing a suspension of the pigment in the solvent (MEK/THF=30/70) with the aid of the dispersant. The resins were dissolved in an analogous solvent, then the crosslinking agent and the inner lubricants of the invention were added. This paint contained 50% by weight of solvent and 50% by weight of the other components a) through c) indicated above. A dispersion was effected in a grinding microball mill, followed by filtration of any non-dispersed oxide aggregates.

The resulting magnetic paint was applied using a reverse roll coating technique onto 6" polyethylene terephthalate tapes having a thickness of 50 microns. The magnetic layer was subjected to orientation of the pigment and to calendering. The tapes so obtained were cut to size ½" and wound in standard video cassettes VHS.

EXAMPLE 2

"Still Frame Life" Test

On the tapes prepared according to example 1, a signal consisting of color bars was recorded, and the signal was reproduced maintaining the tape in the still-frame operation in which the tape is stationary and the magnetic heads, mounted on the head-holding drum in rotation, slide on one path on the tape.

In this test time before tape failure is indicative of the abrasion resistance of the magnetic coating, and is strongly influenced by the presence of lubricants and by their efficacy.

The results are reported in Table 2.

TABLE 2

| Inner lubricant (% by weight) | Still frame life (minutes) |
|---|---|
| A (1%) | 85 |
| A (3%) | 90 |
| C (1%) | 75 |
| ICS (1%) | 55 |
| ICS (3%) | 50 |

EXAMPLE 3

The video tapes prepared according to the method of example 1 were subjected to friction coefficient tests in accordance with standards ASTM D 1894-73 and DIN 53375.

The apparatus utilized consisted of a platform of one of the two materials forming a kinematic couple, in the present case a chrome sheet; the other component of the kinematic couple consisted of a loaded slide covered by the tape stretched on it.

The static and the dynamic coefficient of friction (COF) are reported in Table 3.

TABLE 3

| Inner lubricant (% by weight) | Static COF | Dynamic COF |
|---|---|---|
| A (1%) | 0.45 | 0.42 |
| A (2%) | 0.45 | 0.44 |
| B (1%) | 0.32 | 0.28 |
| C (1%) | 0.50 | 0.48 |
| D (1%) | 0.65 | 0.61 |
| ICS (1%) | 0.70 | 0.68 |
| ICS (3%) | 0.80 | 0.79 |

EXAMPLE 4

Tapes prepared according to example 1 were subjected to the abrasion test conforming to the method developed by the Fulmer Laboratories.

In this test, an abrasivity sensor consisted of a small ceramic cylinder onto which a thin metal layer had been deposited. This metal layer was abraded by the tape sliding on it. Said abrasion caused a change in the electric resistance of the thin-film sensor, giving rise to a signal which, when properly processed and calculated as a function of the time, corresponds to an abrasivity value of the tape. This value should correspond to head wear caused by a tape sliding thereon.

The results are expressed in arbitrary units (i.e., variation of the electric resistance of the sensor per unit of length of the tape for an average of 10 passages on 400 ft of tape) in Table 4.

TABLE 4

| Inner lubricant (% by weight) | Abrasivity |
|---|---|
| A (1%) | 84 |
| A (3%) | 90 |
| D (1%) | 130 |
| ICS (1%) | 156 |
| ICS (3%) | 321 |
| none | 438 |

We claim:

1. A method for preparing magnetic recording media having increased wear resistance, comprising a flexible substrate and a coating thereon comprising a magnetic recording material and a binder, the method comprising:

preparing a resin composition in a suitable solvent, said composition comprising (a) the binder comprising a resin selected from the group consisting of polyvinyl, polyurethane, epoxy, phenolepoxy and mixtures thereof, (b) the magnetic recording medium and (c) at least one bifunctional perfluoropolyether compound; said solvent selected from the group consisting of tetrahydrofuran, methyl-ethyl ketone, isopropanol and mixtures thereof, and applying said composition to the flexible substrate, said bifunctional perfluoropolyether compounds being liquid at a temperature of 25° C. and possessing a solubility at 20° C. in methylethylketone ranging from 0.05% to 2% by weight, the perfluorooxyalkylene chain of said internal lubricants being at least 1000; said bifunctional perfluoropolyether compounds being selected from the group consisting of (I) $TO(CF_2CF_2O)_n(CF_2O)_mT'$;

(II) $TO(CF_2CF_2O)_g(CF_2O)_h(CFCF_2O)_p(CFO)_qT'$;

(III) $TO(CH_2CF_2CF_2O)_sT'$;
(IV) $T(OCF_2CF_2CH_2)_vOR_fO(CH_2CF_2CF_2O)_tT'$;
(V) $TO(CF_2CF_2O)_rT'$;

(VI) $T(OCF-CF)_uOR_fO(CFCF_2O)_uT'$

wherein: T and T', which are the same or different are selected from the group consisting of a) 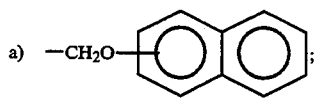 —$CH_2O$— b) —$CH_2O$—$(CH_2CH_2O)_zH$, wherein z is an integer from 1 to 3;

c) 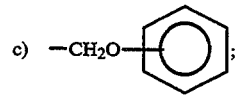 —$CH_2O$— d) —COOR, where R is an alkyl radical with 2 to 12 carbon atoms; and e) 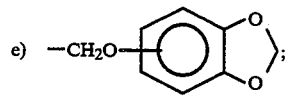 —$CH_2O$— n, m, g, h, p, q, s, t, r and u are integers; $R_f$ is a fluoroalkylene radical, and the perfluoro-oxyalkylene units are statistically distributed along the chain.

2. The method according to claim 1, in which the molecular weight of the perfluoropolyether chain ranges from 1,800 to 4,500.

3. The method according to claim 1, wherein the bifunctional perfluoropolyether compounds have the formula $TO(CF_2CF_2O)_n(CF_2O)_m$—T', wherein T and T' are —$CH_2O(CH_2CH_2O)_zH$, and wherein z is equal to 1 or 2.

* * * * *